(12) United States Patent
Urbach et al.

(10) Patent No.: US 11,465,670 B2
(45) Date of Patent: Oct. 11, 2022

(54) STEERING SHAFT SUPPORT ASSEMBLY

(71) Applicant: TRW AUTOMOTIVE US LLC, Livonia, MI (US)

(72) Inventors: Brian Urbach, Rochester Hills, MI (US); Robert Brown, Waterford, MI (US); Chase Skipinski, Attica, MI (US); Justin Urbach, Rochester Hills, MI (US)

(73) Assignee: ZF Active Safety and Electronics US LLC, Livonia, MI (US)

( * ) Notice: Subject to any disclaimer, the term of this patent is extended or adjusted under 35 U.S.C. 154(b) by 495 days.

(21) Appl. No.: 16/387,923

(22) Filed: Apr. 18, 2019

(65) Prior Publication Data
US 2020/0331519 A1    Oct. 22, 2020

(51) Int. Cl.
*B62D 5/04*      (2006.01)
*B62D 1/16*      (2006.01)
*F16J 15/3232*   (2016.01)
*F16J 15/3252*   (2016.01)

(52) U.S. Cl.
CPC .......... *B62D 5/0409* (2013.01); *B62D 1/16* (2013.01); *B62D 5/0403* (2013.01); *F16J 15/3232* (2013.01); *F16J 15/3252* (2013.01)

(58) Field of Classification Search
CPC ...... B62D 5/0409; B62D 1/16; B62D 5/0403; F16J 15/3232; F16J 15/3252
See application file for complete search history.

(56) References Cited

U.S. PATENT DOCUMENTS

| | | | |
|---|---|---|---|
| 3,529,840 A | 9/1970 | Durham et al. | |
| 5,525,112 A * | 6/1996 | Smith | B62D 1/16 464/162 |
| 5,855,375 A * | 1/1999 | Wilcox | F16J 15/3268 277/551 |
| 6,575,471 B1 * | 6/2003 | Grosspietsch | F16J 15/3236 277/436 |
| 7,753,377 B2 * | 7/2010 | Laplante | F16J 15/3224 277/572 |
| 7,878,293 B2 | 2/2011 | Okada et al. | |
| 7,909,129 B2 | 3/2011 | Showa et al. | |
| 7,988,362 B2 * | 8/2011 | Dittmann | F16C 33/74 384/275 |
| 2006/0169525 A1 * | 8/2006 | Saito | B62D 5/04 180/444 |

(Continued)

FOREIGN PATENT DOCUMENTS

| | | | | |
|---|---|---|---|---|
| DE | 3019736 B1 * | 6/1981 | ........... | F16J 15/3224 |
| DE | 102017004480 A1 * | 11/2018 | ........... | F16J 15/3224 |

(Continued)

*Primary Examiner* — Eugene G Byrd
(74) *Attorney, Agent, or Firm* — Robert James Harwood

(57) ABSTRACT

A steering system for a vehicle includes a housing, an input shaft, and a hybrid shaft support. The housing defines an opening. The input shaft is configured to rotate about an input axis. The hybrid shaft support may be disposed at the opening and configured to couple the input shaft to the housing. The hybrid shaft support may also be configured to support the input shaft as the input shaft rotates. The hybrid shaft support further includes a cylindrical member and a flexible seal over-molded onto the cylindrical member.

18 Claims, 4 Drawing Sheets

(56) References Cited

U.S. PATENT DOCUMENTS

| | | | | |
|---|---|---|---|---|
| 2010/0133758 A1* | 6/2010 | Kanzaki | ........... | F16J 3/042 |
| | | | | 277/561 |
| 2017/0146129 A1* | 5/2017 | Allen | ........... | F16J 15/3224 |
| 2018/0163580 A1* | 6/2018 | Kishiro | ........... | F16J 15/3232 |
| 2019/0017603 A1* | 1/2019 | Li | ........... | F04B 19/22 |

FOREIGN PATENT DOCUMENTS

| | | | | |
|---|---|---|---|---|
| EP | 0557579 A1 * | 9/1993 | ........... | F16J 15/3216 |
| EP | 2420707 | 2/2012 | | |
| FR | 2736700 A1 * | 1/1997 | ........... | F16J 15/322 |
| JP | 2008039026 A * | 2/2008 | ........... | F01L 3/08 |

* cited by examiner

STEERING SHAFT SUPPORT ASSEMBLY

TECHNICAL FIELD

The present disclosure generally relates to a support assembly for a steering system of a vehicle, particularly an electric power steering system.

BACKGROUND

Steering systems 110 generally include a housing 118 for the steering motor (not shown), an input shaft 114, a seal 120 and a roller/ball bearing 124 as shown in FIG. 1. The housing 118 generally defines an opening 122 wherein an input shaft 114 may be rotatably coupled to the opening 122 of housing 118 via a seal 120 and the roller/ball bearing 124. As shown in FIG. 1, the seal 120 may be mounted in contact around the input shaft 114 at the opening 122 wherein the seal 120 prevents external debris from entering the housing 118. The roller/ball bearing 124 is usually separately supported by the housing 118 and may be mounted tightly on the housing 118. Alternatively, the roller/ball bearing 124 may be supported by the surface of the input shaft 114 such that a sealed interface between the bearing 124 and the input shaft 114 is achieved. However, this assembly may exhibit high friction and/or noise/vibration transmissions depending on whether the bearing 124 is tightly mounted the housing 118 or whether the bearing 124 is tightly mounted to the input shaft 114. Accordingly, there is a need to provide an improved steering assembly 110 which exhibits reduced friction, noise and vibration relative to traditional steering shaft support systems.

The above information disclosed in this Background section is only for enhancement of understanding of the background of the invention, and therefore, it may contain information that does not form the prior art that is already known in this country to a person of ordinary skill in the art. Accordingly, there is a need for a fuel injector assembly with improved thermal management performance.

SUMMARY

The present disclosure relates to a steering assembly for a vehicle. In one embodiment, the steering assembly includes a (motor) housing, an input shaft, and a hybrid shaft support. The steering assembly may further include a steering motor and a torque sensor disposed within the housing. The housing defines an opening for the input shaft. The input shaft is configured to rotate about an input axis. The hybrid shaft support may be disposed at the opening of the housing and configured to couple the input shaft to the housing. The hybrid shaft support may also be configured to support the lateral sides of the input shaft as the input shaft rotates. The hybrid shaft support further includes a cylindrical member and a flexible seal over-molded onto the cylindrical member. The cylindrical member and the flexible seal of the hybrid shaft support may be each be formed from a polymeric material wherein the hardness and modulus of elasticity may differ.

In one embodiment, a steering assembly for a vehicle is provided wherein the steering assembly includes a housing, an input shaft, and a hybrid shaft support which couples the input shaft to the housing (or cover portion of the housing). The housing defines an opening. The input shaft is configured to rotate about an input axis. The hybrid shaft support may be disposed at the opening, and as indicated, the hybrid shaft support maybe configured to couple the input shaft to the housing. The hybrid shaft support may also be configured to support the input shaft as the input shaft rotates. The hybrid shaft support further includes a cylindrical member and a flexible seal over-molded onto the cylindrical member.

The cylindrical member and the flexible seal of the hybrid shaft support each define an aperture configured to support the input shaft. The aperture of the cylindrical member, the aperture of the flexible seal are substantially aligned with the axis of the input shaft so as to support the input shaft. The cylindrical member is a hollow member and defines an inner wall surface configured to stabilize the input shaft and the housing against a side load.

The hybrid shaft support may define an outer rib, an inner rib and a recess which is further defined between the outer rib and the inner rib. The outer rib and the inner rib are each configured to prevent debris from entering the housing via the opening. Preferably, the outer rib, the inner rib and the recess are defined in the flexible seal of the hybrid shaft support.

The cylindrical member of the hybrid shaft support may further define a flange integral to a rigid body portion, the flange and the rigid body portion of the hybrid shaft support are configured to engage with the opening of the housing. The rigid flange portion may be integral to the rigid body portion of the cylindrical member—optionally via an injection molding process. The rigid flange portion is configured to structurally support the flexible flange portion against the housing.

In order to secure the flexible seal to the cylindrical member, the flexible seal may be over-molded onto the rigid flange portion of the cylindrical member via a dual shot injection molding process. The flexible seal may optionally define a flexible flange portion which is affixed to the rigid flange portion.

The present disclosure and its particular features and advantages will become more apparent from the following detailed description considered with reference to the accompanying drawings.

BRIEF DESCRIPTION OF THE DRAWINGS

These and other features and advantages of the present disclosure will be apparent from the following detailed description, best mode, claims, and accompanying drawings in which:

Like reference numerals refer to like parts throughout the description of several views of the drawings.

DETAILED DESCRIPTION

Figure 1:
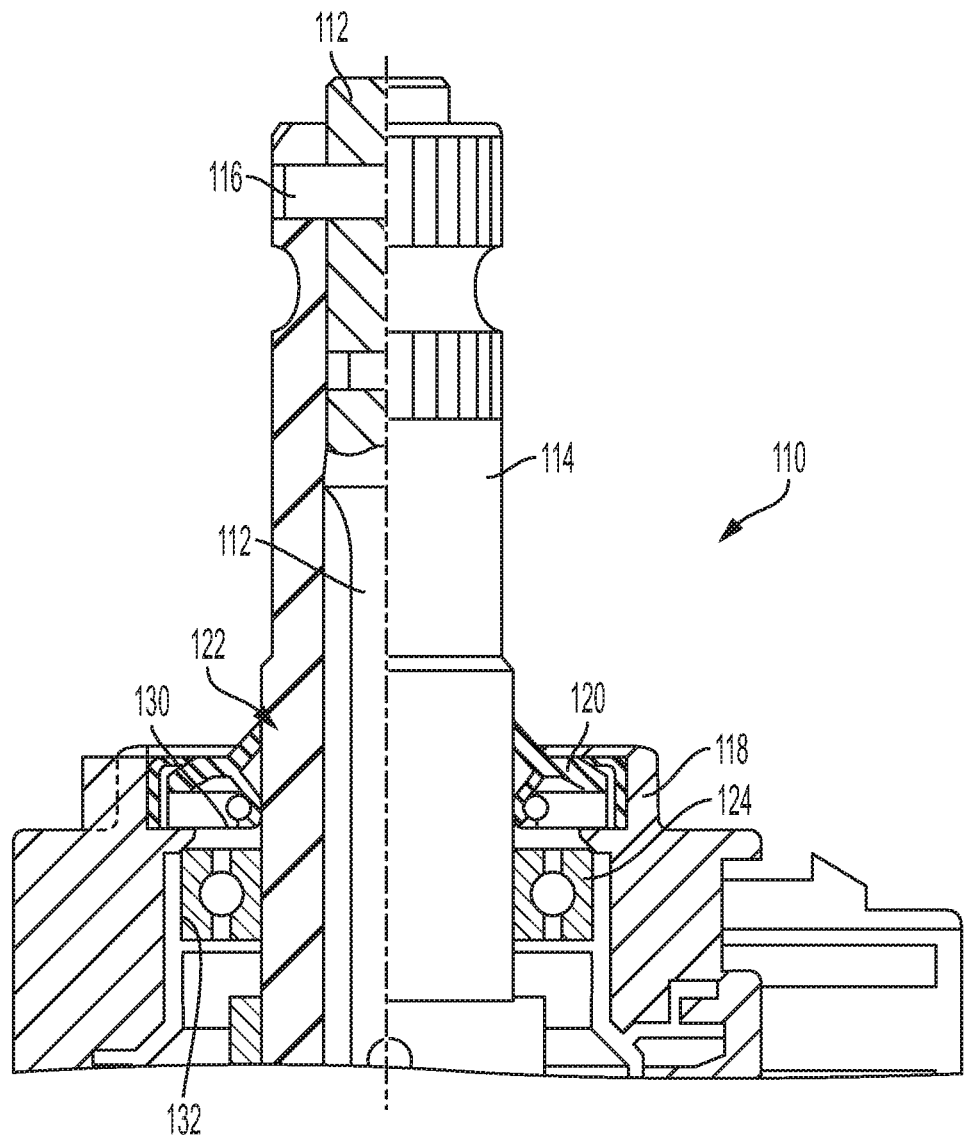
FIG. 1 illustrates a traditional support structure for an input shaft which connects to an electric motor for a steering assembly.

Reference will now be made in detail to presently preferred compositions, embodiments and methods of the present disclosure, which constitute the best modes of practicing the present disclosure presently known to the inventors. The figures are not necessarily to scale. However, it is to be understood that the disclosed embodiments are merely exemplary of the present disclosure that may be embodied in various and alternative forms. Therefore, specific details disclosed herein are not to be interpreted as limiting, but merely as a representative basis for any aspect of the present disclosure and/or as a representative basis for teaching one skilled in the art to variously employ the present disclosure.

Except in the examples, or where otherwise expressly indicated, all numerical quantities in this description indicating amounts of material or conditions of reaction and/or use are to be understood as modified by the word "about" in describing the broadest scope of the present disclosure. Practice within the numerical limits stated is generally preferred. Also, unless expressly stated to the contrary: percent, "parts of," and ratio values are by weight; the description of a group or class of materials as suitable or preferred for a given purpose in connection with the present disclosure implies that mixtures of any two or more of the members of the group or class are equally suitable or preferred; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this present disclosure is not limited to the specific embodiments and methods described below, as specific components and/or conditions may, of course, vary. Furthermore, the terminology used herein is used only for the purpose of describing particular embodiments of the present disclosure and is not intended to be limiting in any manner.

It must also be noted that, as used in the specification and the appended claims, the singular form "a," "an," and "the" comprise plural referents unless the context clearly indicates otherwise. For example, reference to a component in the singular is intended to comprise a plurality of components.

The term "comprising" is synonymous with "including," "having," "containing," or "characterized by." These terms are inclusive and open-ended and do not exclude additional, unrecited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

The terms "comprising", "consisting of", and "consisting essentially of" can be alternatively used. Where one of these three terms is used, the presently disclosed and claimed subject matter can include the use of either of the other two terms.

Throughout this application, where publications are referenced, the disclosures of these publications in their entireties are hereby incorporated by reference into this application to more fully describe the state of the art to which this present disclosure pertains.

The following detailed description is merely exemplary in nature and is not intended to limit the present disclosure or the application and uses of the present disclosure. Furthermore, there is no intention to be bound by any theory presented in the preceding background or the following detailed description.

With reference to FIG. 1, an electric power steering system 110 is shown which provides assistance to a driver through an electronically controlled motor (not shown) which is actuated in response to the detection of torque applied to the steering wheel and input shaft 114. The torsion bar 112 couples the input shaft 114 to the output shaft (not shown). The torsion bar 112 is affixed to the input shaft 114 and the output shaft via a pin 116 at each end of the torsion bar 112. It is understood that the torsion bar 112 can be twisted so that there can be relative rotation between the input shaft 114 and the output shaft. Therefore, when a driver applies torque to a steering wheel, the torsion bar 112 experiences twist and the associated torque sensor (not shown) sends an electric signal (which is proportional to the applied torque) to an electronic control unit. The ECU then supplies current to the steering motor based upon the signals received from the torque sensor so that the motor applies assist torque to the output shaft through a plurality of gears.

However, in order to keep external debris outside of the motor/gear housing 118, a first cavity 130 may be defined in the housing 118 to support a seal 120 and a second cavity 132 may be also be defined in the housing 118 which is proximate to the first cavity 130 wherein the second cavity 132 supports a bearing 124. As shown in FIG. 1, the seal 120 may be disposed within the first cavity 130 of the housing 118 such that the seal 120 engages with the surface of the input shaft 114. Similarly, the roller or ball bearing 124 may be disposed in the second cavity 132 so as to provide lateral support to the input shaft 114 when side loads (not shown) are imposed onto the input shaft 114. As indicated, this arrangement between the housing 118, the seal 120, the input shaft 114 and the bearing 124 may generate undesirable noise and vibration in the steering assembly 110. Accordingly, the present disclosure provides for a steering assembly 10 which reduces such undesirable noise and vibration.

Figure 2:
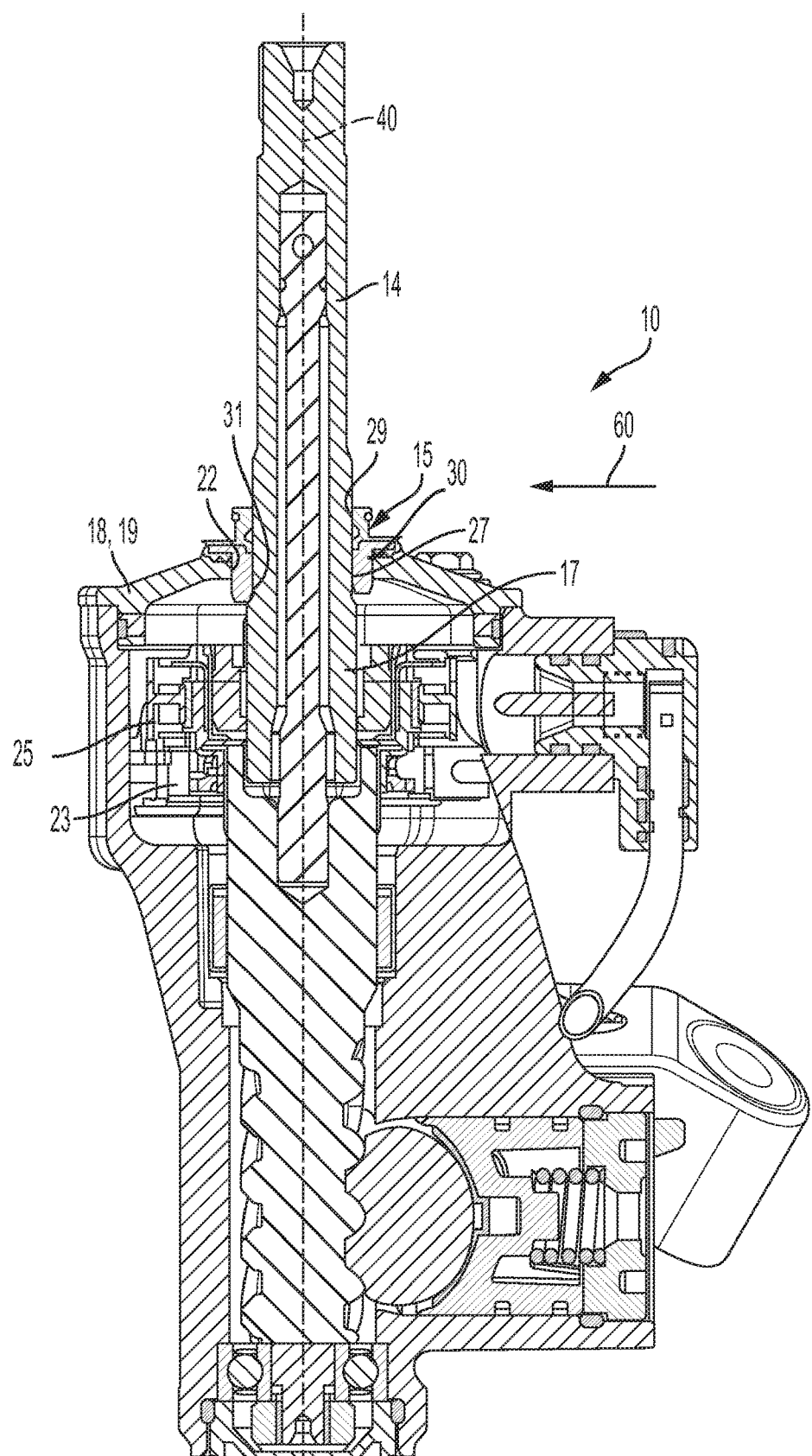
FIG. 2 illustrates an example, non-limiting steering shaft support structure in a steering assembly of the present disclosure.
Figure 3:
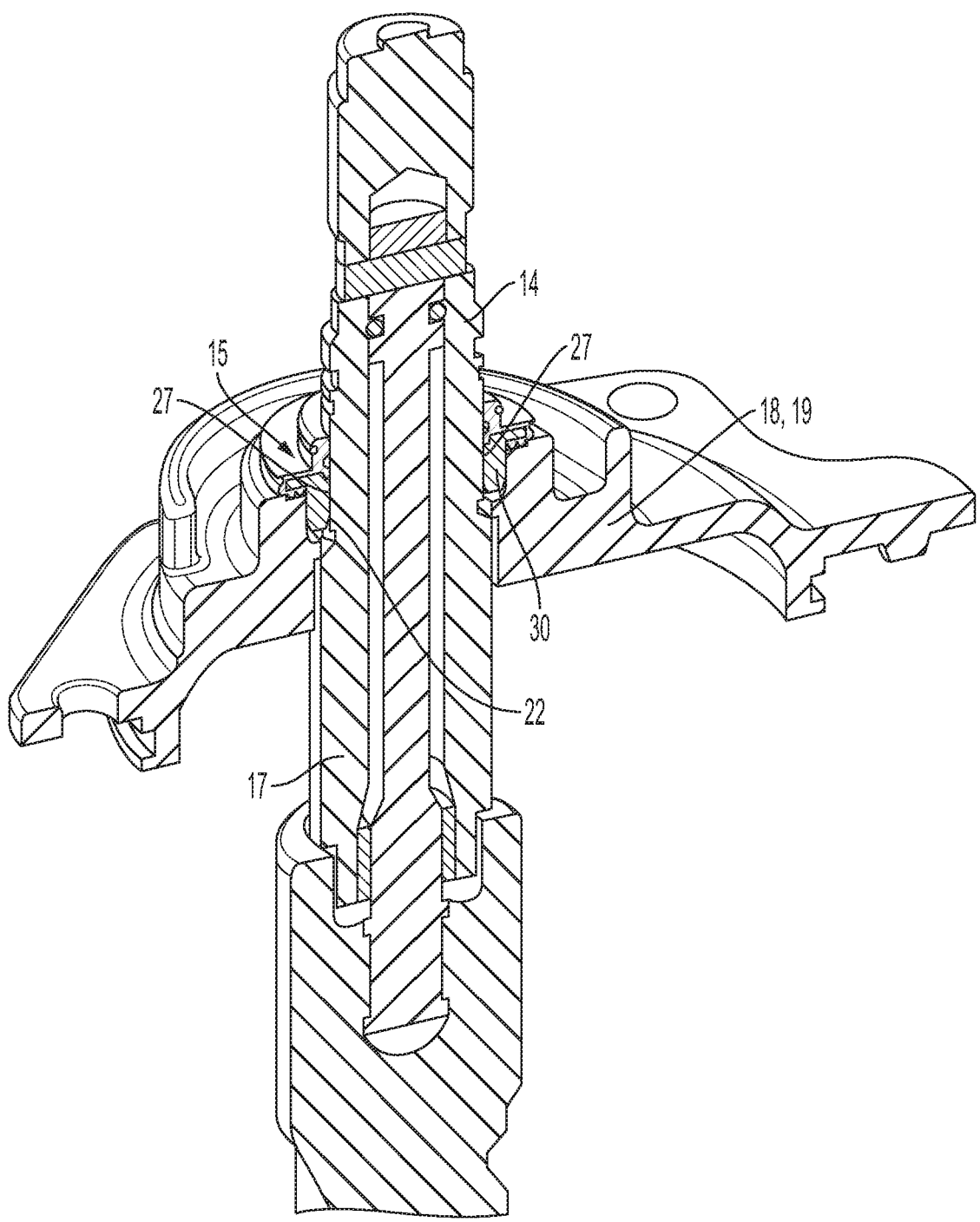
FIG. 3 illustrates an enlarged cross-sectional view through the cover, the input shaft and torsion bar of the present disclosure.

Therefore, as shown in FIG. 2, an example, non-limiting steering assembly 10 of the present disclosure is provided. The steering assembly 10 includes a housing 18, an input shaft 14, and a hybrid shaft support 15 which couples the input shaft 14 to the housing 18 (or a cover portion 19 of the housing 18 as shown in FIG. 3). It is understood that a torque sensor 25, a portion of the input shaft 14, gears and the motor 23 are disposed within the housing 18. As indicated, the steering wheel (not shown) is affixed to the input shaft 14 opposite of the housing 18. The housing 18 defines an opening 22 (FIG. 3) wherein the input shaft 14 is received within an opening 22. Therefore, the input shaft axis 40, the input shaft 14 and the opening 22 are substantially aligned with one another such that the input shaft 14 rotates about the input shaft axis 40 within the opening 22. As shown in FIGS. 2 and 3, the hybrid shaft support 15 may be disposed at the opening 22 and may be be configured to couple the input shaft 14 to the housing 18 at the opening 22. The hybrid shaft support 15 may also be configured to support the outer surface 27 of the input shaft 14 as the input shaft 14 rotates. The hybrid shaft support 15 further includes a cylindrical member 30 and a flexible seal 36 which overmolded onto the cylindrical member 30. The cylindrical member 30 of the hybrid shaft support 15 provides a very low friction surface 50 (see FIG. 4) upon which the input shaft 14 rotates against.

As shown in FIG. 3, the cylindrical member 30 and the flexible seal 36 of the hybrid shaft support 15 each define an aperture 29, 31 configured to receive the input shaft 14. Referring back to FIG. 2, the aperture 31 of the cylindrical member 30, the aperture 29 of the flexible seal 36 are substantially aligned with the axis 40 of the input shaft 14 so as to support the input shaft 14. The cylindrical member 30 is a hollow structure 31 and defines an inner wall surface 50 (FIG. 4) which is configured to stabilize the input shaft 14 and the housing 18 against a side load 60 (FIG. 3). The cylindrical member 30 may, but not necessarily be formed by a polymeric material 34 via an injection molding process.

Figure 4:
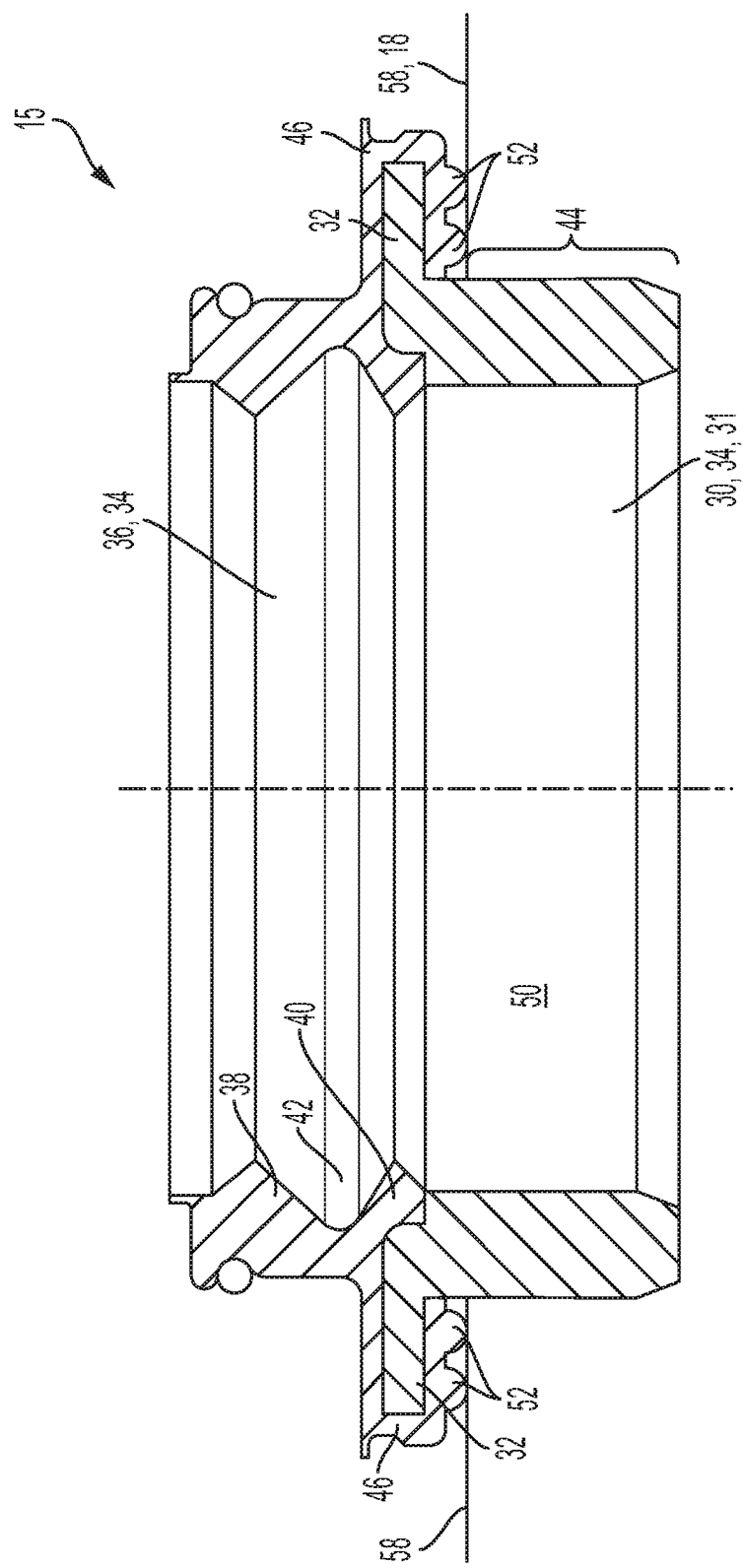
FIG. 4 illustrates an enlarged, example cross-sectional view of a hybrid shaft support according to the present disclosure.

As further shown in FIGS. 2-4, the hybrid shaft support 15 includes a flexible seal 36 which may be over-molded onto the cylindrical member 30. Referring now to FIG. 4, the flexible seal 36 may define an outer rib 38, an inner rib 40 and a recess 42 which is disposed between the outer rib 38 and the inner rib 40. The outer rib 38 and the inner rib 40 are each configured to prevent debris from entering the housing 18 via the opening 22. As indicated, the outer rib 38, the inner rib 40 and the recess 42 may be defined in the flexible seal 36 of the hybrid shaft support 15. However, the aforementioned features may optionally also be defined in the cylindrical member 30 of the hybrid shaft support 15.

Referring again to the cylindrical member 30 of the hybrid shaft support 15 shown in FIG. 4, the cylindrical member 30 (of the hybrid shaft support 15) further defines a flange 32 integral to a rigid body portion 44 wherein the flange 32 and the rigid body portion 44 of the hybrid shaft support 15 are configured to engage with the opening 22 of the housing 18 (see FIG. 3). The rigid flange 32 may be integral to the rigid body portion 44 of the cylindrical member 30 as shown in FIG. 4—optionally via an injection molding process. In order to secure the flexible seal 36 to the cylindrical member 30, the flexible seal 36 may be over-molded onto the rigid flange 32 of the cylindrical member 30. Similar to the cylindrical member 30, the flexible seal 36 defines a flexible flange portion 46 which is affixed to the rigid flange 32. Accordingly, the rigid flange 32 is configured to structurally support the flexible flange portion 46 against the housing 18. As shown in FIG. 4, the flexible flange portion 46 may further optionally define one or more flexible ribs 52 which are configured to engage with (and/or compress against) the surface 58 of the housing 18 when the hybrid shaft support 15 is installed at the opening 22 of the housing 18.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A steering system for a vehicle comprising:
   a housing defining an opening;
   an input shaft configured to rotate about an input axis;
   an output shaft coupled to the input shaft;
   a motor in the housing for applying an assist torque to the output shaft; and
   a hybrid shaft support disposed at the opening and configured to couple the input shaft to the housing, the hybrid shaft support including
      a cylindrical member having a flange with first and second axial end faces that face away from each other and extend transverse to the input axis, and
      a flexible seal over-molded to the cylindrical member, the flexible seal having a flexible flange portion over-molded to the first and second axial end faces of the flange.

2. The steering system as defined in claim 1 wherein the cylindrical member and the flexible seal each define an aperture configured to support the input shaft.

3. The steering system as defined in claim 2 wherein the cylindrical member is hollow and defines an inner wall surface configured to stabilize the input shaft and the housing against a side load.

4. The steering system as defined in claim 3 wherein the hybrid shaft support defines an outer rib, an inner rib and a recess defined between the outer rib and the inner rib.

5. The steering system as defined in claim 4 wherein the outer rib and the inner rib are configured to prevent debris from entering the housing via the opening.

6. The steering system as defined in claim 5 wherein the outer rib, the inner rib and the recess are defined in the flexible seal of the hybrid shaft support.

7. The steering system as defined in claim 1 wherein the flange of the cylindrical member is a rigid flange integral to a rigid body portion of the cylindrical member.

8. The steering system as defined in claim 7 wherein the rigid flange is configured to structurally support the flexible flange portion against the housing.

9. The steering system as defined in claim 1 wherein flexible flange portion engages an axially facing surface of the housing and is axially between the second axial end face and the surface of the housing.

10. The steering system as defined in claim 9 wherein the flexible flange portion includes a plurality of axially extending flexible ribs engaging the surface of the housing.

11. The steering system as defined in claim 9 wherein the first axial end face faces away from the housing and the second axial end face faces toward the housing.

12. The steering system as defined in claim 1 wherein the housing includes a cover portion that defines the opening, the hybrid shaft support being configured to couple the input shaft to the cover portion.

13. The steering system as defined in claim 1 wherein each of the first and second axial end faces extends perpendicular to the input axis.

14. The steering system as defined in claim 1 wherein the housing includes a main body portion and a cover portion that is separate from and coupled to the main body portion, the cover portion defining the opening, the hybrid shaft support being configured to couple the input shaft to the cover portion.

15. The steering system as defined in claim 1 wherein the housing has a first engagement surface extending in a circumferential direction around the opening, the housing having a second engagement surface extending in the circumferential direction around the opening, the first and second engagement surfaces facing in the same direction, the second engagement surface being closer to the output shaft than the first engagement surface, the flexible flange portion engaging both the first and second engagement surfaces.

16. The steering system as defined in claim 1 wherein the output shaft and a portion of the input shaft are in the housing.

17. The steering system as defined in claim 1 further comprising a torque sensor in the housing for sensing a driver applied torque, the motor being controlled as a function of the sensed driver applied torque.

18. The steering system as defined in claim 1 further comprising a torsion bar coupling the input shaft to the output shaft, the torsion bar being entirely within both the input and output shafts.

* * * * *